(12) United States Patent
Fumoto et al.

(10) Patent No.: US 8,147,141 B2
(45) Date of Patent: Apr. 3, 2012

(54) LINEAR MOTION GUIDE UNIT

(75) Inventors: Masashi Fumoto, Aichi-ken (JP); Ryo Kikuchi, Aichi-ken (JP); Takeshi Kakamu, Gifu-ken (JP); Yasuhiro Otsuji, Gifu-ken (JP)

(73) Assignee: Nippon Thompson Co., Ltd., Tokyo (JP)

( * ) Notice: Subject to any disclaimer, the term of this patent is extended or adjusted under 35 U.S.C. 154(b) by 1065 days.

(21) Appl. No.: 12/041,269

(22) Filed: Mar. 3, 2008

(65) Prior Publication Data

US 2008/0285899 A1  Nov. 20, 2008

(30) Foreign Application Priority Data

Mar. 16, 2007  (JP) .................................. 2007-67750

(51) Int. Cl.
*F16C 33/10* (2006.01)

(52) U.S. Cl. .......................................................... 384/13

(58) Field of Classification Search .................... 384/44, 384/45, 13
See application file for complete search history.

(56) References Cited

U.S. PATENT DOCUMENTS

| | | | | |
|---|---|---|---|---|
| 5,380,097 A | * | 1/1995 | Tanaka | 384/13 |
| 5,445,455 A | * | 8/1995 | Holweg | 384/45 |
| 5,582,486 A | * | 12/1996 | Tsukada | 384/13 |
| 5,804,744 A | * | 9/1998 | Tan et al. | 73/864.34 |
| 7,066,650 B2 | * | 6/2006 | Ishihara | 384/44 |
| 7,465,095 B2 | * | 12/2008 | Agari et al. | 384/45 |

FOREIGN PATENT DOCUMENTS

| | | |
|---|---|---|
| JP | 6-35645 | 5/1994 |
| JP | 2005-155909 A | 6/2005 |

* cited by examiner

*Primary Examiner* — Thomas R Hannon
*Assistant Examiner* — Keith Minter
(74) *Attorney, Agent, or Firm* — Browdy and Neimark, PLLC (57) ABSTRACT

A linear motion guide unit is disclosed in which an end cap of a slider has a tube therein to feed even minor amounts of lubricant into a circulating circuit for rollers with no lubricant leakage, making sure of positive lubrication irrespective of working orientations or postures of the linear motion guide unit. A flexible tube made of fluorocarbon polymers is installed in the end cap to run from a lubricant inlet to a turnaround passage, thereby providing a lubricant-supply passage. A distal end of the tube fits into a three-way member made open to the turnaround passage on a spacer part, which is nested inside the end cap.

4 Claims, 5 Drawing Sheets

LINEAR MOTION GUIDE UNIT

FIELD OF THE INVENTION

The present invention relates to a linear motion guide unit comprised of, for example an elongated guide rail and a slider that is allowed to move relatively on the elongated guide rail by virtue of more than one rolling element.

BACKGROUND OF THE INVENTION

Linear motion guide units have been extensively used in recent years with installed in the relatively sliding parts in machinery including machine tools, assembling machines, conveyors, and so on. In machine tools, especially, the linear motion guide units sometimes are needed to work with high accuracy on any tilted surface of the base or machine bed. Most advanced machines, moreover, seek for the linear motion guide units with no lubricant leakage to make them better for the environment and also improved to make lubrication more effectively with only a minor amount of lubricant.

In commonly-assigned Japanese Laid-Open Utility Model Application H06-35 645, a linear rolling-motion guide unit is disclosed in which flow-regulator valves are provided in lubricant grooves cut in the end caps to supply the lubricant equally in amount to both the load-carrying races spaced widthwise away from one another to the right and left in the slider, thereby ensuring better lubrication even if the linear motion guide unit works in any posture other than the horizontal. Nevertheless, the prior linear motion guide unit recited earlier, because of the construction the lubricant was led through the lubricant grooves cut directly into the end caps, was likely to incur any intermittent lubrication especially when the applied lubricant was minuscule or paltry in quantity, for example, as small as 0.03 cc per every twelve minutes. This made it even tougher to ensure the desired amount of lubricant to the load-carrying races in the circulating circuits, which allow the rolling elements to roll through there.

Another linear motion guide unit is disclosed in Japanese Laid-Open Patent Application 2005-155 909, which is constructed in a fashion to make it possible to apply the lubricant from any one of the front and sides of the end cans without causing lubricant leakage as well as accompanying any increase in production cost. In the construction as stated earlier, lubricant groove-formative members are each installed within the end caps that are mounted on the forward and aft ends in the moving direction of the slider. On the lubricant groove-formative members, there are made the lubricant grooves in a way to make it possible to supply the lubricant from any one of the front and sides of the end caps. With the prior linear motion guide unit recited earlier, however, special consideration must be taken that the lubricant does not leak out creep, especially when the applied lubricant is minuscule in quantity. To cope with this, the sealing means used to prevent lubricant leakage from the passages of lubricant flow would inevitably become sophisticated in construction.

Meanwhile, recently advanced machines and instruments including machine tools, and so on look to the development of the linear motion guide unit that can meet all the duties of high-speed sliding performance, high mechanical stiffness, and high accuracy while making it possible to ensure steady lubrication to the circulating circuits for the rolling elements in every working conditions including a tilted posture, another posture lying on its side, and so on even minor quantity of lubricant recommended in an aspect of lessening the environmental impact of lubricant. With the linear motion guide units in which the sliders are allowed to travel lengthwise of the elongated guide rail by virtue of more than one rolling element, positive application of lubricant to the load-carrying races defined between the raceway surfaces to carry the rolling elements through there is of course inevitable to continue maintaining an adequate lubricant film between the load-carrying races and the rolling elements to keep them against metal-to-metal contact that might otherwise occur abnormal wear and scuffing. Of two members of the class of linear motion guide units one of which has balls and the other has cylindrical rollers, the linear motion guide unit in which cylindrical rollers are selected as the rolling elements is preferable for the machine tools in aspects of heavy load-carrying capacity and moderate alignment accuracy. Thus, it remains a major challenge to develop any linear motion guide unit that might meet functional demands as stated earlier.

SUMMARY OF THE INVENTION

The present invention has for its primary object to overcome the major challenge as stated earlier in the linear motion guide unit, and to provide a linear motion guide unit in which a tube for passage of the lubricant flow is installed in an end cap to make it possible to ensure steady and smooth lubrication with lubricant, even though a minor quantity of lubricant, keeping surely the lubricant against leakage en route to lubrication irrespective of working orientation or posture including a tilted posture, another posture lying on its side, and so on. The improved linear motion guide unit of the present invention features a lubrication system to apply even minor amounts of lubricant with smooth and steady conditions, thereby making positive lubrication faster and more efficiently to the rolling elements rolling through a circulating circuit.

The present invention is concerned with a linear motion guide unit; comprising an elongated guide rail having a first raceway surface on a side thereof extending in a lengthwise direction of the guide rail, and a slider allowed to move lengthwise of the elongated guide rail in a sliding manner, the slider being composed of a carriage having thereon a second raceway surface in opposition to the first raceway surface to define a load-carrying race between them and having therein a return passage extending in parallel with the load-carrying race, end caps secured to forward and aft ends of the carriage, one to each end, and made therein with turnaround passages joining the load-carrying race and the return passage together with one another, and more than one rolling element allowed to roll through a circulating circuit made up of the load-carrying race, return passage and the turnaround passages; wherein the slider is provided therein with a lubricant inlet to deliver lubricant into the load-carrying race, and further installed therein with a flexible tube to connect between the lubricant inlet and the circulating circuit; and wherein the tube makes a lubricant passage for the lubricant delivered out of lubricant inlet in the slider.

In one aspect of the present invention, a linear motion guide unit is disclosed in which the lubricant inlet is made in the end cap. Moreover, the lubricant is supplied from the only one lubricant inlet made in the slider.

In another aspect of the present invention, a linear motion guide unit is disclosed in which some tubes extend from the lubricant inlet to their respective circulating circuits, which are made in sidewise opposing bulgy portions of the slider. Moreover, the tubes are all made identical in diameter with one another. As an alternative, the tubes may be made different in diameter with one another.

In another aspect of the present invention, a linear motion guide unit is disclosed in which paired circulating circuits are made in the sidewise opposing bulgy portions of the slider, one pair to each bulgy portion, and further the tubes are connected at their distal ends to three-way members, respectively, which are made open to their associated turnaround passages.

In another aspect of the present invention, a linear motion guide unit is disclosed in which the end cap is composed of an end cap major part to define a curved outside half of the turnaround passage and a spacer part that fits into the end cap major part to define a curved inside half of the turnaround passage, the spacer part having a groove into which the three-way member fits snugly.

In another aspect of the present invention, a linear motion guide unit is disclosed in which a valve to regulate amounts of flow of lubricant is provided at the distal end of the tube. Moreover, the tube is disposed to fit into an oil groove cut into the end cap.

In a further another aspect of the present invention, a linear motion guide unit is disclosed in which the tube is made of fluorocarbon polymers.

The linear motion guide unit constructed as stated earlier can quickly make positive supply of lubricant, even through intermittent application of minor amounts, into the circulating circuits through tubes irrespective of working orientations or postures of the linear motion guide unit.

DETAILED DESCRIPTION OF THE PREFERRED EMBODIMENTS

The linear motion guide unit constructed according to the present invention is best adapted for use in any relatively sliding components in machinery as diverse as machine tools, assembling machines, conveyers, semiconductor equipment, measurement instruments, and so on.

Figure 1:
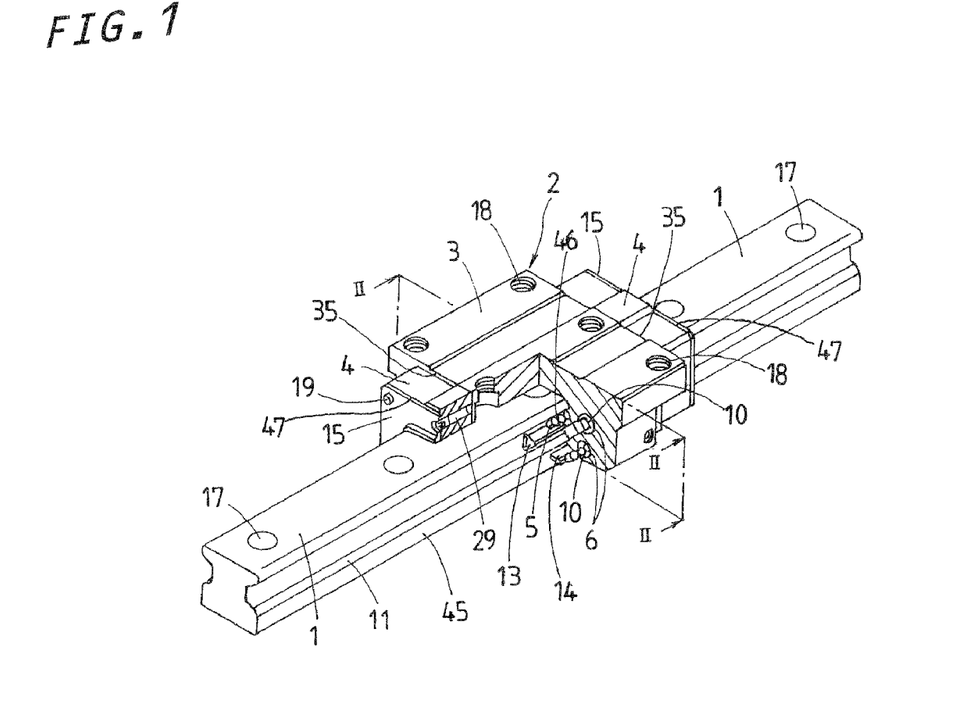
FIG. 1 is a partially cutaway view in perspective illustrating a preferred embodiment of a linear motion guide unit according to the present invention.
Figure 2:
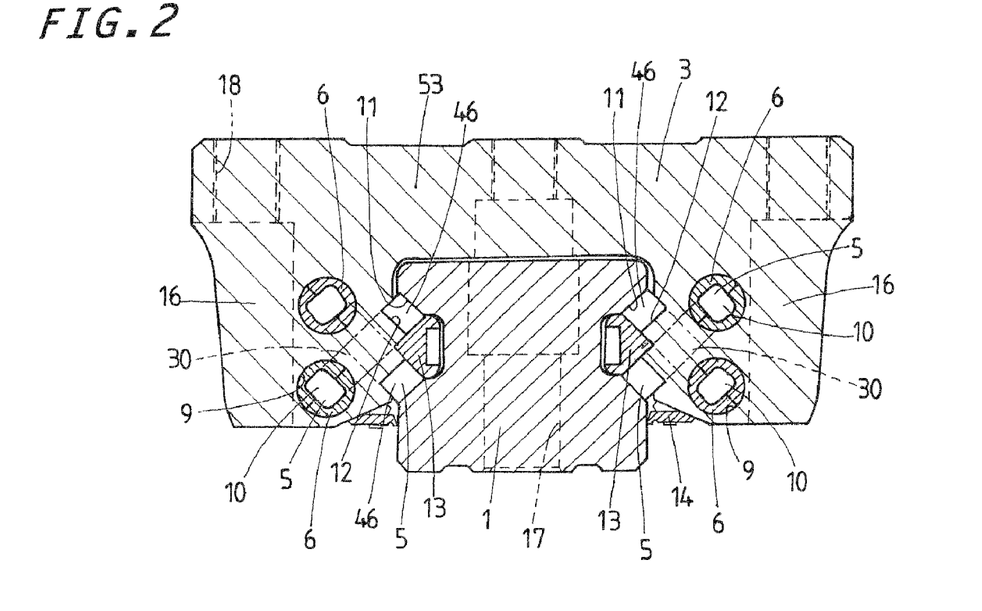
FIG. 2 is an enlarged view in transverse section along the plane of the line II-II of FIG. 1.

Referring now in detail to the drawings, the linear motion guide unit according to the present invention will be explained below. The linear motion guide unit constructed according to the present invention as shown in FIGS. 1 and 2 is mainly comprised of an elongated guide rail 1 made on each lengthwise side 45 thereof with a pair of raceway surfaces 11 or first raceway surfaces, and a slider 2 that fits over or conform to the guide rail 1 in a way moving relatively to the guide rail 1 by virtue of more than one cylinder or roller 5. The linear motion guide unit according to the present invention is primarily designed to make certain of positive lubricant application to the rolling elements, irrespective of the slider 2 fits over the guide rail 1 in any orientation or posture. The slider 2 is composed of a carriage 3 made thereon with raceway surfaces 12 lying in opposition to the raceway surfaces 11 on the guide rail 1 to define load-carrying races 46 between opposite raceway surfaces 11 and 12 and further made the rein with return passages 10 extending in parallel with the load-carrying races 46, forward and aft end caps 4 disposed on lengthwise opposing end faces 35 of the carriage 3 and further made therein with turnaround passages 30 to join the fore-and-aft load-carrying races 46 to their associated return passages 10, respectively, end seals 15 secured to outward surfaces 47 of the end caps 4 to close clearances between the guide rail 1 and the slider 2, more than one roller 5 allowed rolling through circulating circuits 55 (refer to FIG. 4), each of which is made up of any one of the load-carrying races 46, the associated return passage 10 and a pair of the forward and aft turnaround passages 30, and retainer plates 13 secured in the associated load-carrying race 46 in the carriage 3 in a way lying lengthwise of the carriage 3 to retain the rollers 5. The guide rail 1 is made therein with some bolt holes 17 into which fastening bolts 19 fit to secure the guide rail 1 to any mounting base 23. The carriage is made therein with some threaded holes 18 that are used to install any other object thereon. The return passages 10 made inside the carriage 3 is provided with a tubular member that fits snugly into fore-and-aft holes 9 bored in the carriage 3 in parallel with their associated raceway surfaces 12 cut on the carriage 3. The end caps 4 are each made up of an end cap-major part 7 to define a curved outside half of the turnaround passage 30 and a spacer part 8 that fits into the end cap major part 7 to define a curved inside half of the turnaround passage 30. The end caps 4 are each made with holes 42 to allow fastening belts, not shown, extending through there to secure the end caps 4 together with their associated end seals 15 to the carriage 3. The end caps 4 are each made with spigots 43 (refer to FIG. 6), which fit into their associated fore-and-aft holes 9 in the carriage 3 to make the communication between the return passages 10 and their associated turnaround passages 30.

Figure 5:
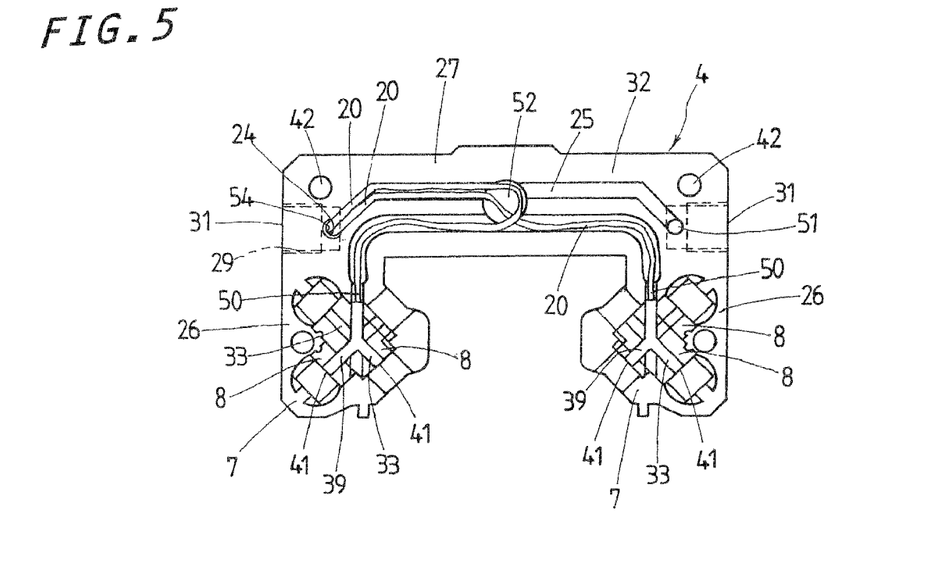
FIG. 5 is a view in rear elevation of an end cap of the linear motion guide unit underlying its companion in FIG. 3, showing a version of tubing geometry in the end cap.

With the linear motion guide unit constructed as stated earlier, since the rollers 5 roll through the load-carrying races 46 between the raceway surfaces 11 and 12 with carrying heavy loads, application of lubricant such as grease, lubricating oil and the like onto the rollers 5 is critical for keeping the rollers 5 against metal-to-metal contact with one another, which would otherwise result in any abnormal wear and damages. To this end, the end caps 4 are each made therein with lubricant inlets 29 to feed the lubricant to the circulating circuits 55, especially, the load-carrying races 46 of the slider 2. In particular as shown in FIGS. 1 and 5, the lubricant inlets 29 are made at not only the middle of the forward and aft end faces 31 but also sidewise opposing outward sides 47 of the end caps 4 to make it possible to lubricate in any direction.

With the linear motion guide unit as stated earlier, all lubricant inlets 29 but one put to lubrication use are plugged with closures. The carriage 3 is composed of sidewise spaced bulgy portions 16 lying in opposition to the lengthwise sides 45 of the guide rail 1, one to each side, and a bridge portion 53 straddling across the guide rail 1 to connect both the bulgy portions 16 with one another. The end caps 4 are also made up of sidewise spaced bulgy portions 26 that parallel to the bulgy portions 16 of the carriage 3, and a bridge portion 27 straddling across the guide rail 1 in parallel with the bridge portion 53 of the carriage 3 to connect both the bulgy portions 26 with one another.

In the sidewise opposing bulgy portions of the slider 2 including both the bulgy portions 16 of the carriage 3 and the bulgy portions 26 of the end caps 4, there are provided paired circulating circuits 55, respectively, in such geometry as shown in FIG. 2. The rollers 5 rolling through one of the paired circulating circuits 55 are allowed to transfer from the downside race 46, carrying downward load because of the slider 2, into the associated upside return passage 10 in the carriage 3 in a circulating manner. In contrast, the rollers 5 rolling through the other of the paired circulating circuits 55 are allowed to transfer from the upside race 46, carrying upward load because of the slider 2, into the associated downside return passage 10 in the carriage 3 in a circulating manner. The turnaround passages 30 in any one of the sidewise opposing bulgy portions 26 of the end caps 4, as shown in FIG. 5, are arranged to intersect one another in a fashion staggered one another. Moreover, a separator 49 is interposed between any two adjoining rollers 5 to keep the adjoining rollers 5 against direct contact with each other. A lower seal 14 is installed underneath the slider 2 to keep foreign matter against creeping into load-carrying races 46.

Figure 3:
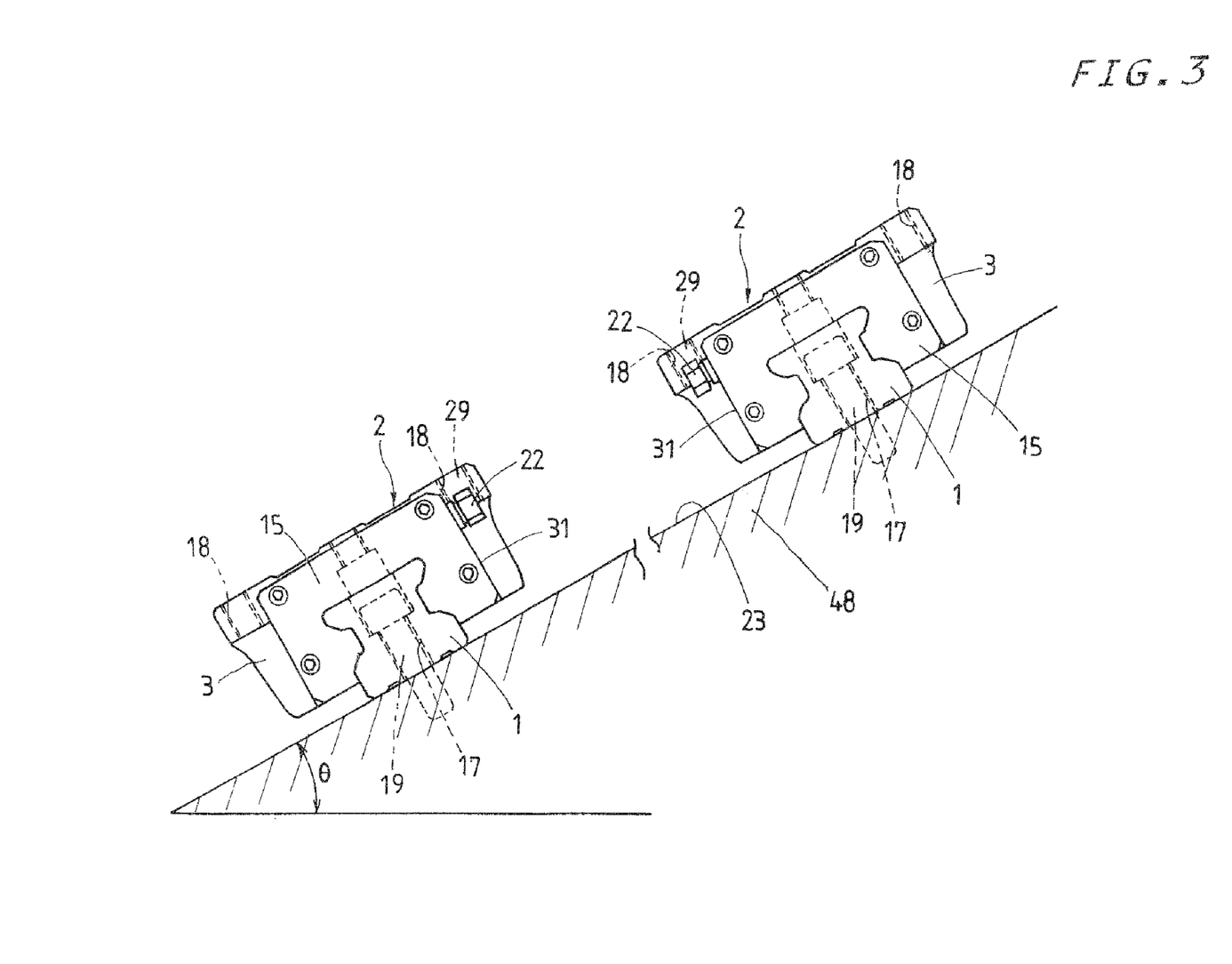
FIG. 3 is a view in end elevation of the linear motion guide unit of FIG. 1, in which a pair of the linear motion guide units is shown as being positioned in juxtaposition on a slant surface of a mounting base.

The linear motion guide unit, as seen in FIG. 3, is sometimes used as tilted at a slant off on a slope 48 of a mounting base or machine bed 23 of, for example machine tool. The slant angle θ is set to, for example 30°, 45°, 60° and 90°, and so on. With the version shown in FIG. 3, the slope 48 is made to have a slant angle θ of 30°. On the slope 48, there is mounted a pair of guide rails 1 in a way extending in parallel with one another. Although not shown, two sliders 2 fit over one of the paired guide rails 1 in tandem. Thus, four sliders 2 in all are installed to carry any moving object such as a table or the like above the mounting base 48, making sure of steady and stable movement of the object in a linearly traveling manner. Pipe joints 22 for lubricant tube in the version shown are located in facing each other between spaced parallel sliders 2 in such a fashion that the end caps 4 fitting over the downside guide rail 1 have the pipe joints 22 mating with the lubricant inlets 29 in their upward sides 31 while other end caps 4 fitting over the upside guide rail 1 have other pipe joints 22 mating with the lubricant inlets 29 in their downward sides 31.

With modern machinery including machine tools and so on, some sliders 2 are simultaneously delivered with oily lubricant rich in fluidity in unified manner through lubricant lines reaching from a lubricant-supply pump to the pipe joints 22 threaded into the associated lubricant inlets 29. Upon unified delivery of lubricant to the turnaround passages 30 in the version shown here, the pipe joints 22 are arranged in, for example, such geometry that one L (at lower left in FIG. 3) of the spaced parallel linear motion guide units has the pipe joints 22 on the upward sides 31 of the end caps 4 tilted to the left in FIG. 3 while the other linear motion guide unit R (at upper right in FIG. 3) has the pipe joints 22 on the downward sides 31 of the end caps 4 tilted to the same direction. With the end cap 4 shown in FIG. 5, the lubricant inlet 29 open to a tube 20 is made on the outward side 31 (at left in FIG. 5), which would face upward as seen head-on in the linear motion guide unit L lying at lower left on the mounting base 23 tilted to the left in FIG. 3. In the version illustrated here, the lubricant inlet 29 of the end cap 4 is made in a threaded blind hole while the tube 20 fits into a communication path 51 made in a wall around the lubricant inlet 29 in a way its tip opens into the lubricant inlet 29. Sealant 24 is applied around the tube 20 extending through the communication path 51. Thus, the lubricant forced out of the lubricant-supply pump into the lubricant inlet 29 gets far from the lubricant inlet 29 into the open tip of the tube 20, then reaching any lubricating points in the turnaround passage 30 of the circulating circuit 55 via the tube 20.

Figure 4:
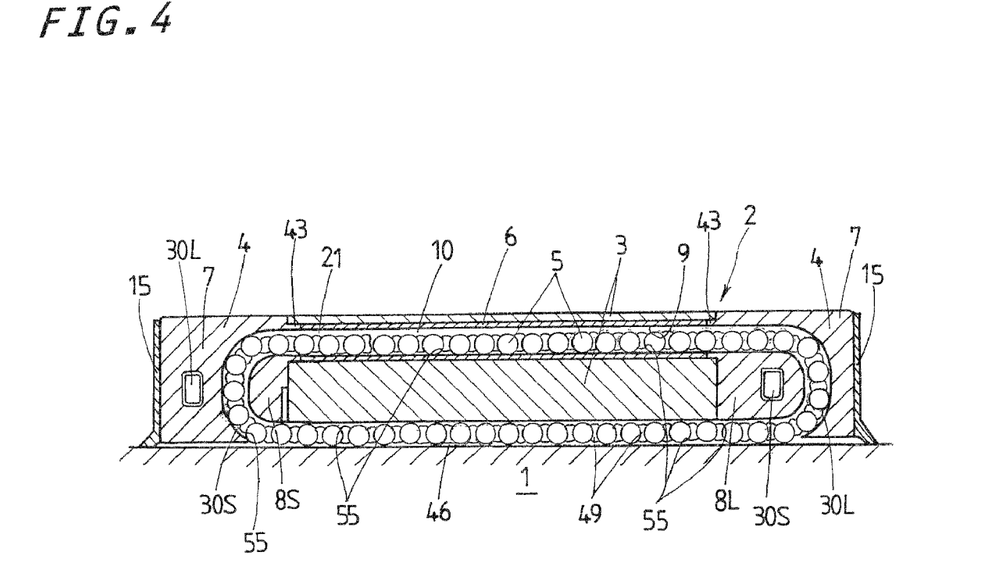
FIG. 4 is a view in longitudinal section of the linear motion guide unit of FIG. 1 to illustrate a circulating circuit made in a slider that fits over or conforms to a guide rail.

As seen in FIG. 4, the turnaround passages 30 made in the end cap 4 to loop the circulating circuits 55 are so arranged as to intersect one another in a fashion that any one of the turnaround passages 30 is staggered in the end cap 4 from the other in fore-and-aft direction of the slider 2. Thus, the circulating circuits 55 to allow the rollers 5 through there are each composed of the load-carrying race 46, the return passage 10, and longer and shorter turnaround passages 30L and 30S in the end caps 4 to connect the load-carrying race 46 to the associated return passage 10. The lubricant supplied through the lubricant inlet 29 of the end cap 4 flows or oozes out of an opening or spout 41 made in the rear of the spacer part 8, which forms an inward surface 32 of the end cap 4 that comes into abutment against the associated end face 35 of the carriage 3. The lubricant as shown in particular in FIG. 5 is spewed out through a clearance left in a boundary between the turnaround passages 30 and their associated load-carrying races 46 and then entrained into the load-carrying races 46 as the rollers 5 enter the load-carrying races 46. In addition to the above, the lubricant is also spewed out through a clearance in a boundary between the turnaround passages 30 and their associated return passages 10 and then entrained into the load-carrying races 46 as the rollers 5 run in circulating manner through the load-carrying races 46.

The linear motion guide unit of the present invention, as seen particularly in FIG. 5, features such construction that a tube rich in flexibility is laid inside the end cap 4 in a way connecting between any one of the lubricant inlets 29 and the turnaround passages 30 of the circulating circuits 55 to provide a lubricant-supply system to lubricate the circulating circuit 55 with the lubricant delivered from the lubricant inlets 29 through the tube 20. To cope with the mission as stated earlier, the tube 20 is connected at one end thereof with the lubricant inlet 29 while at the opposite end with a three-way member 39 to supply the lubricant from the lubricant inlet 29 to the three-way member 39. Different tubes 20 fit side by side into any common one lubricant inlet 29 while leading separately at their opposite ends to the turnaround passages 30 of the paired circulating circuits 55, one to each turnaround passage, in order to ensure the positive application of lubricant to both the sidewise spaced turnaround passages 30 of the paired circulating circuits 55 that are made in sidewise opposing bulgy portions 26, one to each bulgy portion. With the version shown here, there are used two tubes 20 extending in opposite directions widthwise of the end cap 4. Distal end 50 of each tube 20 fits into one way of the three-way member 39 other ways of which are made open to different turnaround passages 30 of the paired circulating circuits 55, one to each turnaround passage. On the inward or rearward surface 32 of the end cap 4 to be brought into mating with the associated end face 35 of the carriage 3, moreover, there is made as in conventional construction an oil groove 25 extending from the lubricant inlets 29 to both the sidewise spaced turnaround passages 30 of the paired circulating circuits 55 that are made in sidewise opposing bulgy portions 26. Once the end cap 4 was assembled with the carriage 3, an oil passage for lubricant forced out of the lubricant inlets 29 is defined between the oil groove 25 and the associated end face 35 of the carriage 3.

Figure 6:
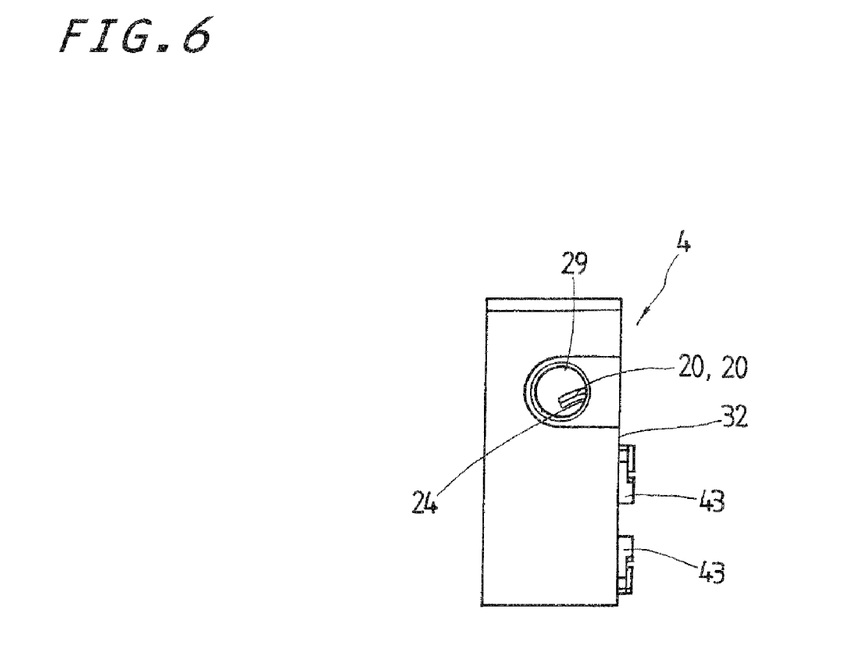
FIG. 6 is a view in side elevation of the end cap of FIG. 5.
Figure 7:
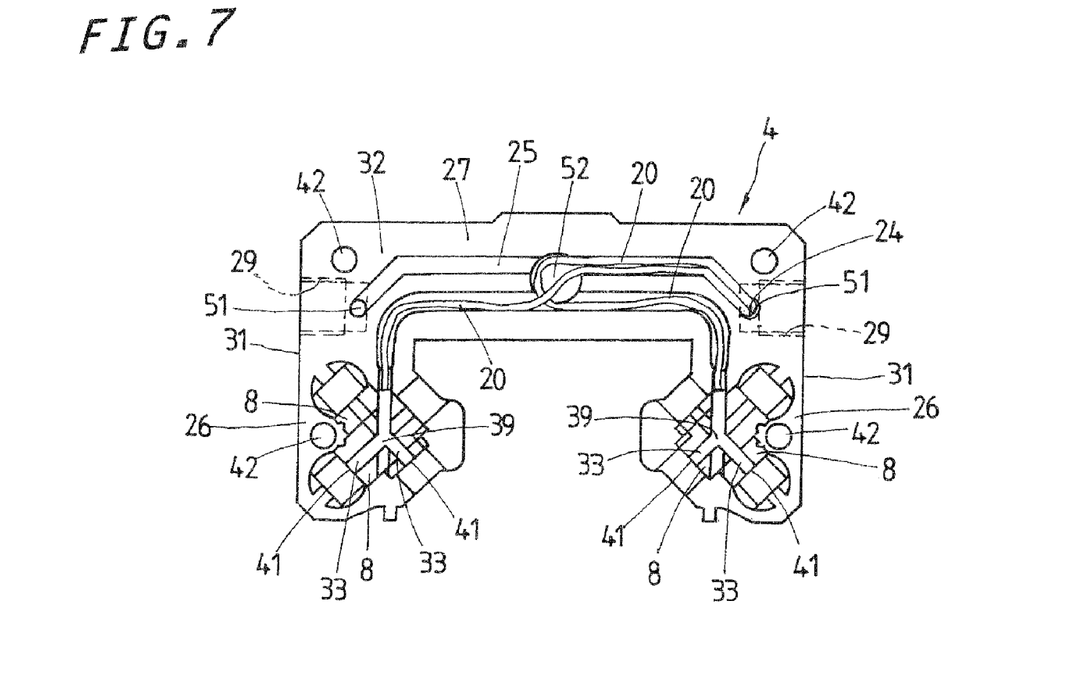
FIG. 7 is a view in rear elevation of an end cap of the linear motion guide unit overlying above its companion in FIG. 3, showing a version of tubing geometry in the end cap.

The layout of the tubes 20 in the version shown in FIGS. 5 to 7 is envisaged that the linear motion guide unit of the present invention works on the slope 48 of a mounting base 23 tilting 30°. The end cap 4 is made with the sidewise opposing bulgy portions 26 in each of which the paired turnaround passages 30 crossing at right angles with one another are formed by the combination of the end cap major parts 7 to define outside curved halves of the turnaround passages 30 and spacer parts 8 (larger spacer part 8L and smaller spacer part 8S) nested inside the end cap major parts 7 in a geometry crossing at right angles with the turnaround passages 30 defined with the end cap major parts 7. In detail, the larger spacer part 8L constitutes the inside curved half of the longer turnaround passage 30L in combination with the end cap major part 7 while the smaller spacer part 8S constitutes the inside curved half of the shorter turnaround passage 30S in combination with the larger spacer part 8L, which has been once assembled with the end cap major part 7. More particularly, the outside curved halves of the shorter turnaround passages 30S are defined by the combination of the end cap major part 7 with the larger spacer part 8L. On an inward exposed surface of the mated spacers 8S and 8L, there are cut oil grooves 33 extending saltirewise to communicate with the oil groove 25 on the end cap major part 7, reaching the associated turnaround passages 30 of the circulating circuits 55, respectively. The three-way member 39 fits into the oil grooves 33 of the spacer part 8 and has grooves 37 thereon. Once the three-way member 39 has fitted into the oil grooves 33 of the spacer 8, the oil grooves 37 on the three-way member 39 come in to mating with their associated oil grooves 33 of the spacer 8 to finish the oil delivery passages.

With the version illustrated, two parallel tubes 20 are disposed to fit together into the oil groove 25. The two tubes are arranged side by side in a fashion that their tips are trued up and led together through an opening 51 (at left of the end cap) so as to come into the lubricant inlet 29. The tubes stretch abreast from the lubricant inlet 29 to the middle 52 of the end cap 4 and then diverge from one another at the middle 52 towards their respective associated turnaround passages 30 in the sidewise opposing bulgy portions 26. Over the distal ends 50 of the tubes 20, there are fitted the three-way members 39 of which several ways are made open to their associated turnaround passages 30L, 30S. The lubricant inlet 29 into which the two tubes 20 fit together is closed around the tubes 20 with any sealant 24 to prevent lubricant leakage. As an alternative, any other sealing member may be used in place of the sealant 24. The three-way member 39 in any one of the bulgy portions 26 is open to the return passage 10 joining the shorter turnaround passage 30S in the same bulgy portions 26, while also to the load-carrying race 46 joining the longer turnaround passage 30L. Another three-way member 39 in the opposite bulgy portions 26 looks onto the return passage 10 joining the longer turnaround passage 30L in the opposite bulgy portions 26, while also to the load-carrying race 46 joining the shorter turnaround passage 30S.

Figure 8:
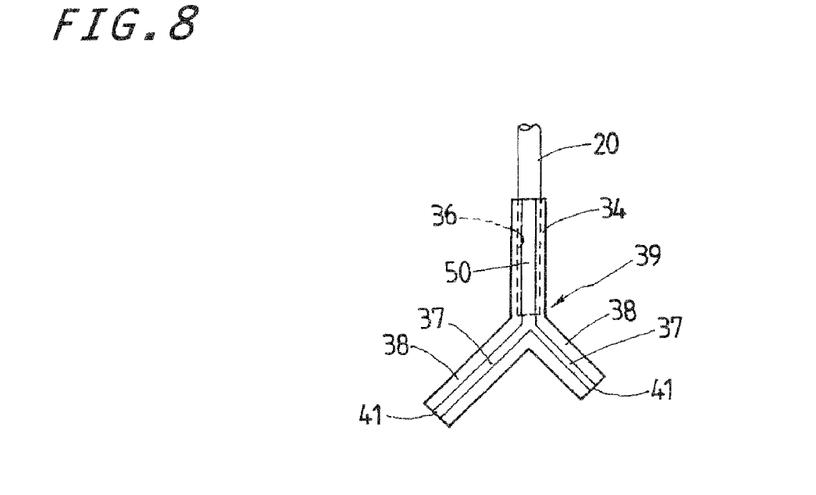
FIG. 8 is a view in rear elevation of a three-way member to be connected to an opening end of the tube in a way fitting into oiling grooves cut in a spacer part.

The three-way member 39, as shown in FIG. 8, has an arm 34 made therein with a groove 36 circular in section to fit over the tube 20, and two arms 38, 38 forked out from there and made therein with oil grooves 37 to communicate with the open tip of the tube 20. With the version stated now, the three-way member 39 fits into the oil grooves 33 on the spacer part 8 in such a fashion that the oil grooves 37 made in the three-way member 39 co-operate with their associated oil grooves 33 of the spacer part 8 to finish the lubricant-supply system. As an alternative, any communicating holes, although not shown, may be made in the three-way member 39 in place of the oil grooves 37. The three-way member 39 is made of, for example synthetic rubber. With the linear motion guide unit R installed on the mounting base as shown in FIG. 3, the lubricant forced out of the supply pump into the joint 22 coupled to one of the lubricant inlets 29 of the slider 2 flows through the tubes 20, entering the circulating circuits 55. Thus, the lubricant, even minor amounts can be applied to the circulating circuits 55 with no leakage to make sure of positive lubrication of the circulating circuits 55.

Example 1

Application of lubricant was conducted using the linear motion guide unit installed askew on the mounting base 23, which was set at an angle θ of 30°. Lubricant was fed with an amount of 0.03 cc/5 min. using a lubricant-supply pump, not shown, working at discharge pressure of 1.4 Mpa. The Lubricant had an intermediate value of 68 cST (IS0, VG68) in kinematic viscosity at the temperature of 40°. Two tubes used were identical in their dimensions callipered: inside diameter of φ 0.65 mm and outside diameter of φφ1.25 mm, but somewhat different in length: only the tube belonging to the left three-way member L is a bit longer than the other. It will be however understood that the tubes are allowed to make them identical in their length. As an alternative, the tubes 20 may be made different in their diameter depending on what extent the linear motion guide unit is tilted, the lubricant-supply conditions, and so on to make certain of even supply in amounts of lubricant to all the circulating circuits 55. The tubes 20 were made of fluorocarbon polymers rich in fluidity, heat resistance and chemical resistance.

With the end cap 4 constructed as shown in FIG. 7, the lubricant inlet 29, unlike the end cap 4 in FIG. 5, is made on opposite side or the right side of the linear motion guide unit. The end cap 4 in FIG. 7 is seen head-on in the other linear motion guide unit R in FIG. 3. The lubricant inlet 29 of this end cap 4 is made on the outward side 31 (at right in FIG. 7), which would face downward once the linear motion guide unit R has been installed with leaning as shown in FIG. 3 on the mounting base 23 tilted to the left in FIG. 3. The location of the lubricant inlet 29 is determined in the aspect of the lubricant-supply tubing layout for the unified delivery of lubricant.

With the end cap 4 in FIG. 7 having lubricant inlet 29 on the outward side thereof opposite the side of the end cap 4 in FIG. 5, two parallel tubes 20, like the tubes 20 in FIG. 5, are disposed to extend out of the lubricant inlet 29 to the middle 52 of the end cap 4 and then diverge from one another at the middle 52 towards their respective associated turnaround passages 30 in the sidewise opposing bulgy portions 26. Over the distal ends 50 of the tubes 20, there are fitted the three-way members 39 of which several ways are made open to their associated turnaround passages 30L, 30S.

With the linear motion guide unit R constructed as stated earlier, the lubricant fed from the lubricant-supply pump into the pipe joint 22 coupled to the one lubricant inlet 29, in spite of an upward-stream from the bottom side in a leaned geometry as shown in FIG. 3, is allowed to reach respective circulating circuits 55 through the tubes 20. As described in the Example 1, even minor amounts of lubricant make sure of steady lubrication of the circulating circuits 55 without causing any lubricant leakage en route to lubrication. Thus, the linear motion guide unit having the tubes 20 disposed from the lubricant inlet 29 to the circulating circuits 55 in the slider 2 ensures steady lubrication with even a bit quantity of lubricant, whether the slider 2 gets leaned or not. Moreover, the tubes can be made ready to installation, for example, they have to only fit into the conventional oil grooves in the end caps 4.

Figure 9:
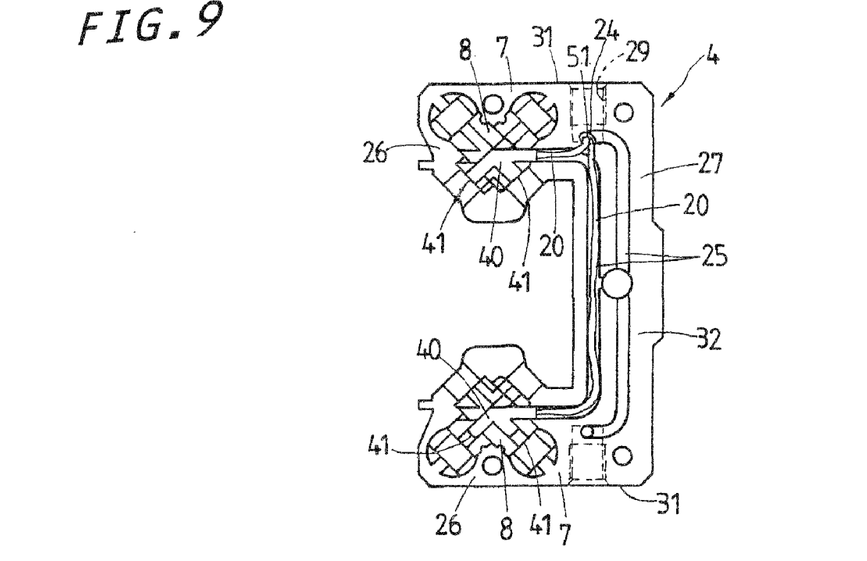
FIG. 9 is a view in rear elevation of another version of the tubing geometry inside the end cap combined into the slider of the linear motion guide unit of FIG. 1, but the slider stands upright in a fashion lying on its side.

Referring to FIG. 9, there is shown another version of the linear motion guide unit constructed according to the present invention to disclose the tubing geometry of the tubes 20 when the slant angle θ is set at 90°, or the linear motion guide unit is on the mounting base lying upright on its sides. It will be clearly understood that the second version is different in tubing geometry from the first version stated earlier. The lubricant inlet 29 to receive the tubes 20 therein is made on the left outward side of the end cap 4, which the second version illustrated, two tubes 20 arranged in a fashion that their tips are trued up and led together through an opening so as to come into the lubricant inlet 29 (at left of the end cap). The tubes 20 diverge from one another the farther they get from the lubricant inlet 29 in a way one of them reaches the turnaround passages 30 in the nearby bulgy portion 26 while another extends to another turnaround passages 30 in the faraway bulgy portion 26 through a bridge portion 27 straddling across the guide rail 1 to connect both the bulgy portions 26 with one another. Over the distal ends 50 of the tubes 20, there are fitted three-way members 40 of which several ways are made open to their associated turnaround passages 30L, 30S.

Figure 10:
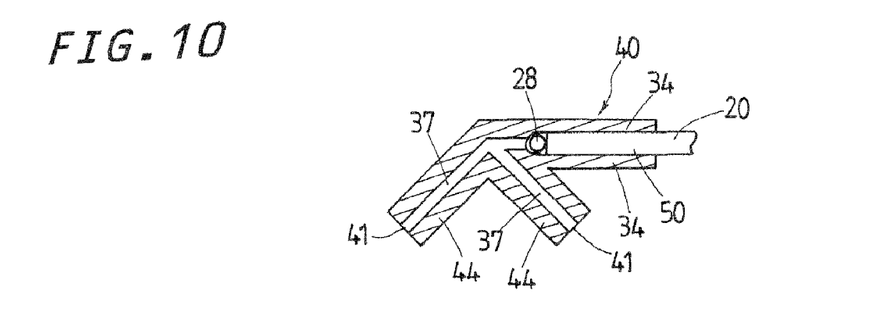
FIG. 10 is a view in section to illustrate a connecting geometry between the tube and the three-way member installed in the spacer part.

With the second version on its side, the three-way member 40 in the bulgy portions 26 at the bottom side is open to the return passages 10 joining the turnaround passage 30L, 30S in the same bulgy portions 26. Another three-way member 40 in the opposite bulgy portions 26 at the top side looks onto the load-carrying races 46 joining the turnaround passages 30L, 30S. The opening communicating with the lubricant inlet 29 into which the two tubes 20 fit together is closed around the tubes 20 with any sealant 24 to prevent lubricant leakage through there. As an alternative, any other sealing member to fit into the opening may be used in place of the sealant 24. The three-way member 40, as shown in FIG. 10, has an arm 34 made therein with a groove 36 circular in section to fit over the tube 20, and two arms 44, 44 forked out from there and made therein with oil grooves 37 to
communicate with the open tip of the tube 20. Once the three-way member 40 has fitted into the oil grooves 33 on the spacer part 8, the oil grooves 37 made in the three-way member 40 cooperate with their associated oil grooves 33 of the spacer part 8 to finish the lubricant-supply system. As an alternative, any communicating holes, although not shown, may be made in the three-way member 40 in place of the oil grooves 37. With this second version stated now, the three-way member 40 is made of metallic material adapted for metal-working to make accurate parts. At the distal ends of the tubes 20 inserted into the three-way member 40, moreover, there are provided steel balls 28 to regulate the amounts of flow of lubricant, one to each tube. The regulator valves 28 are arranged in both the sidewise opposing three-way members 40. The balls or flow-regulator valves 28 are installed in a loose-fit manner inside the associated arms 34 of the three-way member 40. The balls 28 for the flow-regulators are expected to control the flow of lubricant so as to keep the lubricant against flowing dominantly in the bottom side of the linear motion guide unit on its side. With the linear motion guide unit constructed as stated earlier, even if the linear motion guide unit stands upright on its side (θ=90°), the lubricant delivered out of the lubricant-supply pump into the only one joint 22 led to the associated lubricant inlet 29 is allowed to spew out into all the circulating circuits 55 alike through the tubes 20. Thus, the lubricant, even minor amounts as proved in the following example, can be applied to the circulating circuits 55 with no leakage to make sure of positive lubrication of the circulating circuits 55.

Example 2

Application of lubricant was verified using the linear motion guide unit installed in perpendicular to the horizontal on the upright mounting base, which was set at a slant angle θ of 90°. Lubricant was fed with an amount of 0.03 cc/12 min. using a lubricant-supply pump, not shown, working at discharge pressure of 1.4 Mpa. The lubricant had a medium value of 32 cST (IS0, VG32) in kinematic viscosity at the temperature of 40°. Two tubes used were identical in their dimensions calliperedo: inside diameter of φ 0.5 mm and outside diameter of φ 1.0 mm. As an alternative, the tubes 20 may be made different in their diameter to make certain of even supply in amounts of lubricant to all the circulating circuits 55. The tubes 20 were made of fluorocarbon polymers rich in fluidity, heat resistance and chemical resistance.

What is claimed is:

1. A linear motion guide unit; comprising an elongated guide rail having first raceway surfaces on a first side thereof and second raceway surfaces on a second side thereof extending in a lengthwise direction of the guide rail, and a slider allowed to move lengthwise of the elongated guide rail in a sliding manner, the slider being composed of a carriage having thereon third raceway surfaces in opposition to the first raceway surfaces and fourth raceway surfaces in opposition to the second raceway surfaces to define load-carrying races between the first and third raceway surfaces and the second and fourth raceway surfaces and having therein return passages extending in parallel with the load-carrying races, end caps secured to forward and aft ends of the carriage, one to each end, and made therein with turnaround passages joining the load-carrying races and the return passage together with one another, and a plurality of rolling elements allowed to roll through circulating circuits each of which is made up of each of the load-carrying race, return passage and the turnaround passages;

wherein the slider has a plurality of flexible tubes lying in a lubricant inlet and oil grooves in the end cap to connect between the lubricant inlet and the circulating circuits in sidewise opposing bulgy portions of the slider, the plurality of flexible tubes being installed in the end cap to provide lubricant passages for lubricant delivered out of the lubricant inlet in the load-carrying race, wherein the circulating circuits are in pairs in each of the bulgy portions of the slider and the tubes are connected at distal ends thereof to three-way members, respectively, which are open to the turnaround passages of the circulating circuits, wherein the end caps are composed of end cap major parts to define curved outside halves of the turnaround passages and spacer parts that fit into the end cap major parts to define curved inside halves of the turnaround passages, and wherein the three-way members connected to the tubes are fitted in grooves in the spacer parts.

2. A linear motion guide unit constructed as defined in claim 1, wherein lubricant is supplied from the only one lubricant inlet made in the slider.

3. A linear motion guide unit constructed as defined in claim 1, wherein a valve to regulate amounts of flow of lubricant is provided at one of the distal ends of the tubes.

4. A linear motion guide unit constructed as defined in claim 1, wherein the tubes are made of fluorocarbon polymers.

* * * * *